United States Patent [19]

Hosoya et al.

[11] Patent Number: 4,982,532
[45] Date of Patent: Jan. 8, 1991

[54] METHOD AND APPARATUS FOR FINISHING GEAR TOOTH SURFACES OF A BEVEL GEAR

[75] Inventors: Norio Hosoya, Fuchu; Shigeyuki Yoneyama, Hachioji, both of Japan

[73] Assignee: Ken-Ichi Hattori, Alexandria, Va.

[21] Appl. No.: 392,248

[22] Filed: Aug. 11, 1989

[30] Foreign Application Priority Data

Sep. 1, 1988 [JP] Japan .................. 63-218830

[51] Int. Cl.$^5$ .................................. B24B 19/00
[52] U.S. Cl. .................. 51/287; 51/105 GG; 51/5 C; 51/52 R; 409/26; 409/29; 409/51
[58] Field of Search ............ 51/26, 287, 105 GG, 51/5 C, 52 R, 52 HB, 105 HB; 409/26, 29, 49, 51

[56] References Cited

U.S. PATENT DOCUMENTS

| | | | |
|---|---|---|---|
| 2,904,934 | 9/1959 | Schicht | 51/26 |
| 3,142,940 | 8/1964 | Rebeshi | 51/26 |
| 3,740,899 | 6/1973 | Sorokovshi | 51/26 |
| 3,994,098 | 11/1976 | Koneramann | 51/26 |
| 4,765,095 | 8/1988 | Wiener | 51/287 |
| 4,799,337 | 1/1989 | Kotthous | 51/287 |

FOREIGN PATENT DOCUMENTS

| | | | |
|---|---|---|---|
| 207207 | 1/1921 | Canada | 51/287 |
| WO87/07551 | 12/1987 | PCT Int'l Appl. | 51/287 |
| 1009659 | 4/1983 | U.S.S.R. | 51/287 |

*Primary Examiner*—Frederick R. Schmidt
*Assistant Examiner*—Blynn Shideler
*Attorney, Agent, or Firm*—Armstrong, Nikaido, Marmelstein, Kubovcik & Murray

[57] ABSTRACT

A method and apparatus for finishing bevel gears has a pair of bevel gears which are rotatably engaged in a meshing fashion while being imparted with a brake force therebetween and one of the bevel gears is rocked against the other along a tooth profile direction extending between a tooth top and tooth root of a gear tooth in a manner such that the rocking bevel gear swingably rocks around its pitch apex of the base pitch cone thereof. Further, the bevel gears finish contacting gear tooth surfaces of at least one of the bevel gears both by rotational contact and by sliding contact by rocking motion.

12 Claims, 4 Drawing Sheets

METHOD AND APPARATUS FOR FINISHING GEAR TOOTH SURFACES OF A BEVEL GEAR

FIELD OF THE INVENTION

This invention relates to a method and an apparatus for finishing gear tooth surfaces of a bevel gear.

BACKGROUND OF THE INVENTION

As a prior art for finishing a gear surface of a bevel gear, U.S. Pat. No. 3,740,899 discloses a method, as shown in FIG. 7, where the bevel gear is rocked along arrow 30 to perform a lap finishing. The rocking direction of the engaging gear teeth is shown by arrow 30'.

On the other hand, U.S. Pat. No. 2,904,934 discloses another sample of lap finishing where, as shown in FIG. 8, the bevel gears are rocked along the gear trace direction 31'.

In both of the above prior art patents, the rocking motion is not generated in a manner such that it has a pivot center which is a pitch apex 19 of a base pitch circle cone. Thus, the finished product is not finished to a high tolerance and also has the disadvantages of higher noise and lower productivity.

SUMMARY OF THE INVENTION

An object of the instant invention is to overcome the above problems and the basic principle of operation is described in detail in applicant's own prior U.S. patent application Ser. No. 230,546.

The principle of the invention is schematically shown in FIG. 5. The bevel gears 11 and/or 12 are relatively rocked around their common pivot axis 18 which is positioned at the pitch apex 19 of the base pitch circle cone such that each of them is relatively rocked along a sectional arc.

DETAILED DESCRIPTION OF THE INVENTION

The detailed description of the invention is hereinafter explained with reference to FIGS. 1-6.

Figure 1:
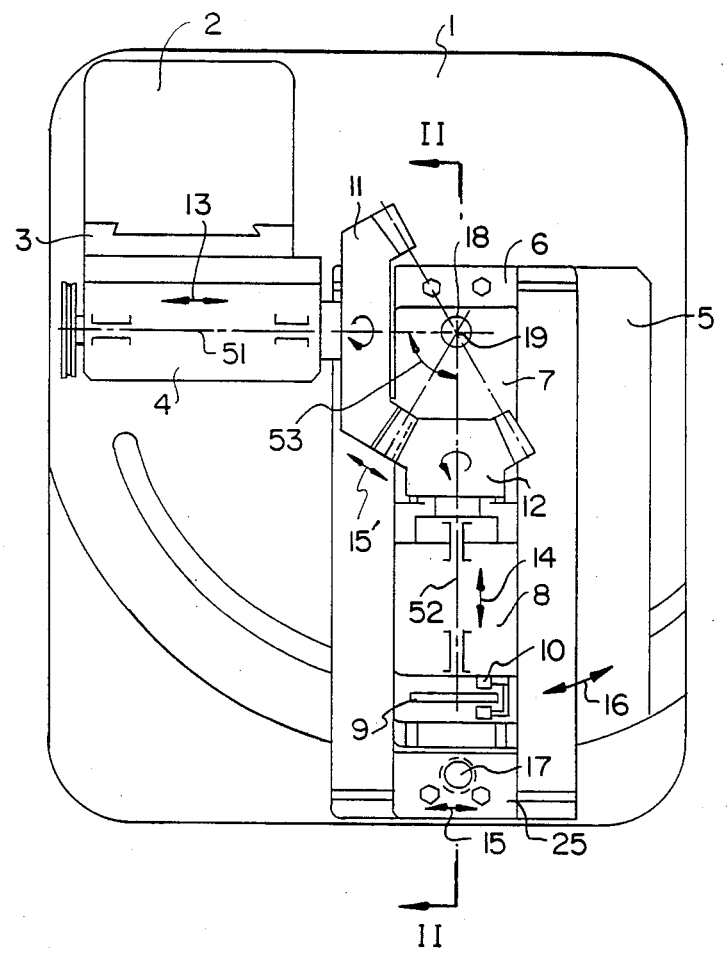
FIG. 1 illustrates a plan view of the apparatus of the invention.
Figure 2:
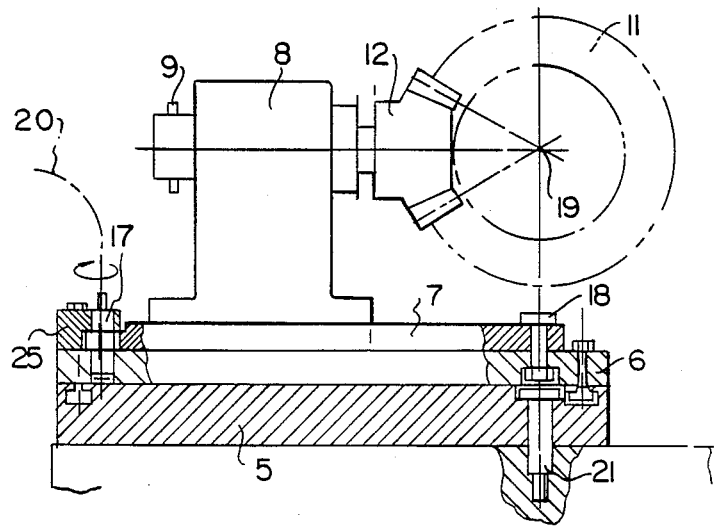
FIG. 2 illustrates a cross-sectional view taken along line II—II of FIG. 1.
Figure 3:
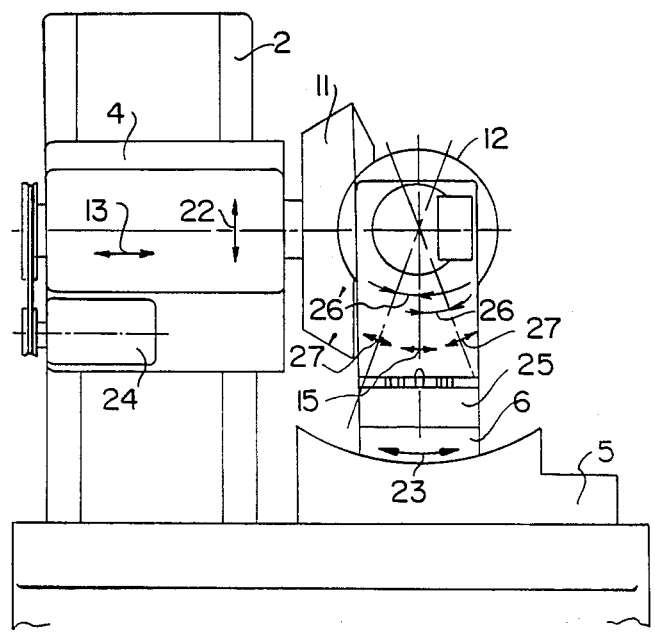
FIG. 3 illustrates a side elevational view of FIG. 1.

In FIGS. 1-3, 1 denotes a bed, 2 a column, 3 a vertical movement saddle, 4 a support box, 5 an angle adjustment saddle, 6 a swivel base, 7 a swingably movable rock plate, and 8 a support box.

In this apparatus, each bevel gear 11 or 12 is adjustably supported by a conventional means such that they can move along arrows 13, 14, 16, 22 and 23. The pitch apex 19 of the base pitch circle cone is positioned on the extension of the pivot axis 18.

The bevel gear 11 is fixed on a support axis 51 of a support box 4 driven by a motor 24 and adjusted along arrows 13 and 22 in a manner such that the pitch apex 19 is positioned on the extension of the rotational center 21 of an angle adjustment saddle 5 as well as on a support axis 52 of support box 8.

Then the bevel gear 12 is fixed on the support axis 52 of the support box 8 and is adjusted along arrow 14 such that the vertex 19 is positioned on a central axis of the pivot axis 18 and is further adjusted along arrow 16 such that an angle 53 takes, for example, a right angle, as shown in FIG. 1.

Further, a brake means comprising a brake member 10 and a disc 9 fixed on the support axis 52 of the bevel gear 12 is provided for generating an adequate contact pressure between engaging gear teeth of the bevel gears 11 and 12.

The rock plate 7 is swingably rocked by an eccentric cam 17 driven by a flexible shaft 20 around the pivot axis 18 positioned on the swivel base 6. As a result, the bevel gear 12 rock against the bevel gear 11 along curved arrow 15'.

The rock plate 7 is supported by, for example, an air bearing and is rocked between the swivel base 6 and a guide plate 25.

The stroke of the rocking motion of the bevel gear 12 along arrow 15' is adjusted such that adequate contact is produced between bevel gears 11 and 12. Thus, the bevel gear 12 moves back and forth with respect to the bevel gear 11.

According to the lap finishing of this method and the apparatus, both reciprocal lap finishing by the meshing workpiece bevel gears 11 and 12 and the lap finishing by the rocking motion around the vertex are simultaneously performed and, as a result, an ideal and rational finishing is performed.

Further, if the swivel base 6 is rotated along arrow 23 in FIG. 3 for a pressure angle 26 (an angle 28 in FIG. 6) or 26' (a reversed angle 28') around the central axis 52 containing the pitch apex 19 in order to adjust the direction of the rocking motion 15, a further ideal lap finishing is performed.

If the pivot axis 18 is also provided with a small amount of eccentricity, for example from 0.01 mm to 0.2 mm, the contact between two gear surfaces become more smooth.

Figure 4:
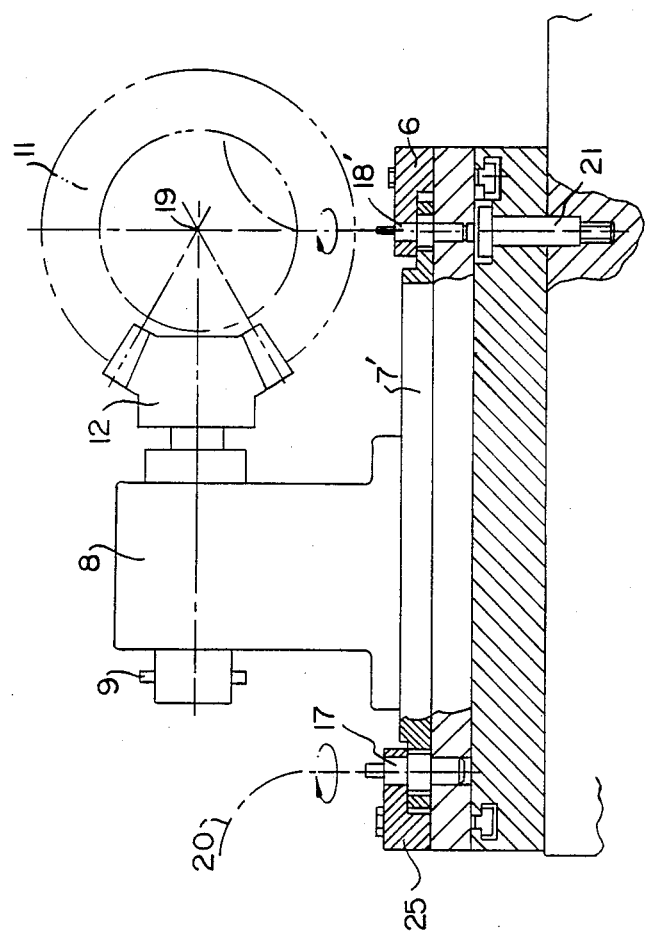
FIG. 4 illustrates another embodiment of the apparatus of FIG. 2.
Figure 7:
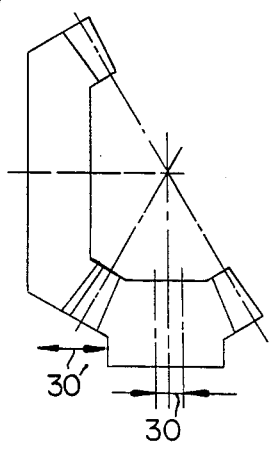
FIG. 7 illustrates a prior method for finishing a bevel gear.
Figure 8:
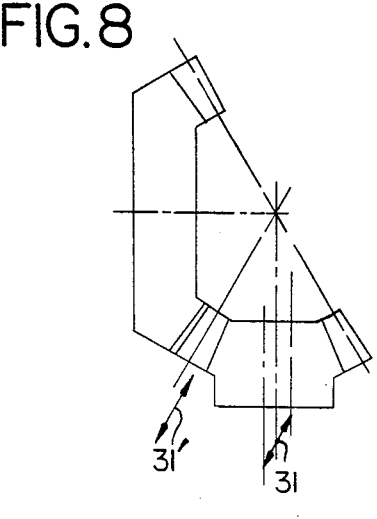
FIG. 8 illustrates another prior method for finishing a bevel gear.
Figure 5:
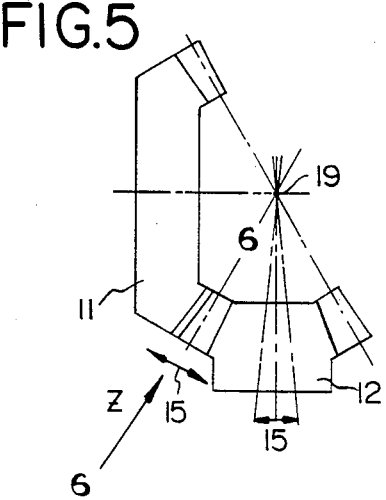
FIG. 5 illustrates a principle of the invention.
Figure 6:
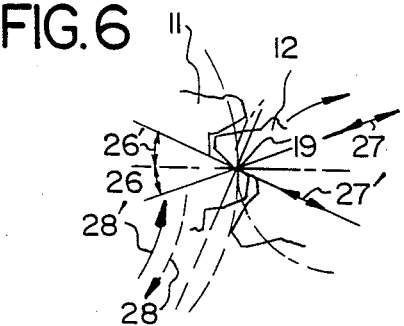
FIG. 6 illustrates a cross-sectional view taken along line VI—VI in FIG. 5.

FIG. 4 shows another embodiment of rock plate 7' which has another pivot axis 18'. In this embodiment either pivot axis 17 or 18' can be a rocking motion generator or a pivot axis.

In the above embodiment, the invention is explained by the reciprocal finishing between two workpiece bevel gears 11 and 12, however, one of them can be replaced by a master bevel gear having a sufficient hardness, precision and finishing ability to finish the other workpiece gear.

According to the embodiment described above, the bevel gears 11 and 12 must be used as a pair in order to obtain a correct meshing, however, by the method of using a master bevel gear, a reciprocal bevel gear can be obtained and, therefore, it should not be used as a pair.

As to the master bevel gear, it can be used as the one on which diamond powders are deposited on the gear surface by electro-deposition or the like. It also can be used as the one which is formed into a bevel gear shape. In a case of using the master bevel gear, cutting oil such as machine oil can be used. It is more effective to provide supersonic vibration when lapping liquid or machine oil is used.

This apparatus can also be applied to hypoid gears and others.

Thus, according to the present invention, since the bevel gear 12 is rocked along an arc, the finishing of the gear surface become more ideal and the finishing accuracy is distinctly improved. Also, the noise of the finished gears is remarkably reduced and productivity is increased.

What is claimed is:

1. A method for finishing involute gear tooth surfaces of bevel gears, comprising the steps of:
   rotatably supporting a first bevel gear;
   rotatably supporting a second bevel gear in a meshing fashion with said first bevel gear in a manner such contacting involute gear tooth surfaces of said first and second bevel gears contact each other through a shifting contact point therebetween and further that a pitch apex of said first bevel gear coincides with that of said second bevel gear;
   rotating at least one of said first and second bevel gears while providing a brake force therebetween; and
   providing at least one of said first and second bevel gears with a rocking arc motion around the pitch apex thereof such that the relative rocking motion between said contacting involute gear tooth surfaces at any position of said shifting contact pint swings along an arc extending along a tooth profile direction extending between a tooth top and a tooth root of a gear tooth of each of said contact involute gear tooth surface,
   wherein said contacting gear tooth surfaces are finished by both rotational contact therebetween and sliding contact by said relative rocking motion.

2. The method of claim 1, wherein said first and second bevel gears are workpiece gears.

3. The method of claim 1, wherein one of said first and second bevel gears is a master bevel gear and the other bevel gear is a workpiece bevel gear.

4. The method of claim 1 further comprising the step of adjusting a direction of rocking arc motion between said first and second bevel gears to have a pressure angle between said contacting involute gear tooth surfaces.

5. The method of claim 1, wherein said rocking arc motion is provided at said pitch apex.

6. The method of claim 1, further comprising the step of providing said rocked bevel gear with a second rocking arc motion substantially vertical to said rocking arc motion.

7. An apparatus for finishing bevel gears, comprising:
   a first supporting means for rotatably supporting a first bevel gear;
   a second supporting means for rotatably supporting a second bevel gear engaging with said first bevel gear in a meshing fashion in a manner such that contacting involute gear tooth surfaces of said first and second bevel gears contact each other through a shifting contact point therebetween and further that a pitch apex of said first bevel gear coincides with that of said second bevel gear;
   a third supporting means for supporting at least one of said first and second supporting means, said third supporting means having a pivot positioned substantially on said pitch apex and being swingable therearound to provide the bevel gear supported thereon with a rocking arc motion around said pitch apex such that the relative rocking motion between said contacting involute gear tooth surfaces at any position of said shifting contact point swings along an arc extending along a tooth profile direction extending between a tooth top and tooth root thereof;
   a driving means for providing said third supporting means with said rocking arc motion,
   wherein said contacting involute gear tooth surfaces are finished by both rotational contact therebetween and sliding contact by said relative rocking motion.

8. The apparatus of claim 7 further comprising an adjusting means for adjusting a direction of rocking arc motion between said first and second bevel gears to have a pressure angle between said contacting involute gear tooth surfaces.

9. The apparatus of claim 7, wherein said first and second bevel gears are workpiece gears.

10. The apparatus of claim 7, wherein one of said first and second bevel gears is a master bevel gear and the other bevel gear is a workpiece gear.

11. The apparatus of claim 7 further comprising a forth supporting means for supporting said third supporting means such that the bevel gear supported thereon is provided with a second rocking arc motion substantially vertical to said rocking arc motion.

12. The apparatus of claim 7, wherein said rocking means is provided at said pivot.

* * * * *